METHOD AND APPARATUS FOR OPTICAL INSPECTION OF GLASS SHEETS

Filed April 21, 1959 6 Sheets-Sheet 1

INVENTORS
Charles H. Griss and
BY Morris F. Brillhart
Nobbe & Swope
ATTORNEYS

METHOD AND APPARATUS FOR OPTICAL INSPECTION OF GLASS SHEETS

Filed April 21, 1959

6 Sheets-Sheet 2

INVENTORS
Charles H. Griss and
Morris F. Brillhart
BY
Nobbe & Swope
ATTORNEYS

METHOD AND APPARATUS FOR OPTICAL INSPECTION OF GLASS SHEETS

Filed April 21, 1959 6 Sheets-Sheet 3

INVENTORS
Charles H. Griss and
BY Morris F. Brillhart
Nobbe & Swope
ATTORNEYS

METHOD AND APPARATUS FOR OPTICAL INSPECTION OF GLASS SHEETS

Filed April 21, 1959 6 Sheets-Sheet 4

INVENTORS
Charles H. Griss and
BY Morris F. Brillhart
Nobbe & Swope
ATTORNEYS

METHOD AND APPARATUS FOR OPTICAL INSPECTION OF GLASS SHEETS

Filed April 21, 1959

INVENTORS
Charles H. Griss and
BY Morris R. Brillhart
Nobbe & Swope
ATTORNEYS

INVENTORS
Charles H. Griss and
Morris F. Brillhart
BY Nobbe & Swope
ATTORNEYS

3,081,665
METHOD AND APPARATUS FOR OPTICAL INSPECTION OF GLASS SHEETS

Charles H. Griss, Perrysburg, and Morris F. Brillhart, Toledo, Ohio, assignors to Libbey-Owens-Ford Glass Company, Toledo, Ohio, a corporation of Ohio Filed Apr. 21, 1959, Ser. No. 807,841
5 Claims. (Cl. 88—14)

This invention relates to improved method and apparatus for automatically inspecting glass sheets for optical defects not readily apparent to the unaided eye.

One common defect in glass sheets or plates is the lack of parallelism between the major surface areas of the individual sheets. This defect, known as "wedge," may exist uniformly throughout a sheet of glass or it may exist randomly in areas of greater or lesser extent. If a glass sheet or plate is used as a window and it contains areas exhibiting different amounts of wedge any objects viewed through the window are distorted and their apparent positions do not coincide with the actual location of the objects.

Ordinarily, this effect is not of sufficient magnitude to cause any great concern. Wedge in the glass, however, shows up markedly if the object being viewed is a bright light source such as, for example, the headlight of an automobile viewed against a dark background. Under such lighting conditions, a piece of glass exhibiting wedge produces a "ghost" or second image that is displaced from the primary image of the light source. There is an apparent difference in position of the two images that varies depending upon the amount of wedge present in the glass, that is, the departure from a parallel position of the major surfaces of the glass sheets. The "ghost" or second image is produced by light rays that enter the first surface of the glass, are reflected from the back surface, reflected from the front surface and then emerge from the rear surface. If the two surfaces are exactly parallel, there is no readily perceptible difference in position between the apparent location of the object and its actual position.

The wedge defects in glass sheets may be observed in the laboratory or in an inspection department by setting up test apparatus to approximate the above described conditions. However, such a method of inspection is not only tiresome, but also time consuming in that each small area of the glass sheet must be inspected and an estimate of the amount of wedge found in each of the areas must be made.

An apparatus for automatically inspecting sheets of glass for wedge defect of the same general type referred to above is disclosed in U.S. Patent No. 2,735,331, issued February 21, 1956, to Harold A. McMaster and Roy W. Wampler.

In the above-mentioned patent, the presence of wedge is detected by observing the deviation caused on refraction of light passing through the glass. According to the disclosed apparatus, a glass sheet to be inspected is positioned in front of a concave mirror and is illuminated by a concentrated light source located closely adjacent the center of curvature of the concave mirror. An image of the light source, as focused by the mirror, is received upon a small opaque screen of merely enough area to intercept all of the undeviated light. Areas of the glass that exhibit wedge will act as thin prisms refracting the rays of light to produce deviations of the transmitted rays of light, both when they pass through the glass going to the concave mirror and when they pass through the glass on reflection from the mirror. The deviations so produced are additive resulting in final deviated rays of light that miss the opaque screen and are collected and directed toward a light sensing means for signaling the presence of wedge in the glass sheet being inspected.

Although this apparatus, generally speaking, was found to be satisfactory, a certain amount of scattered light is constantly emitted toward and received by the light sensing means, such as a photocell, because of haze or films on the surface of the glass being inspected. If this scattered light is of a relatively high intensity, on striking the photocell it will occasionally give an erroneous signal. In order to overcome this scattered light difficulty it has been proposed, as disclosed in the application of Charles H. Griss and Normal V. Huber, Serial No. 470,598, now U.S. Patent No. 2,889,737, issued June 9, 1959, to take the deviated rays of light caused by non-parallelism of the surfaces of a glass sheet being inspected and interrupt them intermittently by a mechanical light-chopper before the light rays impinged on the light sensing means. These intermittent rays were caused to generate a correspondingly pulsating electric signal which in turn actuated a device to indicate an area of wedge on the glass. However, the operation of such a mechanical light chopper is not, in all cases, entirely satisfactory.

In both of the methods referred to above for determining wedge, merely the presence or absence of a given amount of wedge is indicated, with no indication of the particular direction that the wedge takes. A determination of the direction of the wedge is attendant with important practical advantages. For example, in the manufacture of laminated glass windshields where a high degree of transparency and a minimum amount of distortion is required, it is important that such windshields do not exhibit second or "ghost" images mentioned above. Accordingly, when a glass sheet to be used in a windshield is checked and found to have a portion exhibiting wedge in a certain direction, this sheet may be paired up with a sheet exhibiting wedge in the opposite direction so that in laminating the two glass sheets the areas of wedge extending in opposite directions will cancel the effect of each other and thus eliminate undesirable second or "ghost" images, It is therefore an important object of the present invention to provide an improved inspection apparatus and means for indicating the direction of wedge in glass sheets or plates.

Another important object of the invention is to provide a novel method and apparatus for optical inspection of glass sheets that indicates both the areas of wedge in the sheets as well as the direction that such wedge takes.

Other objects and advantages of the invention will become more apparent during the course of the following description when taken in connection with the accompanying drawings.

In the drawings, wherein like numerals are employed to designate like parts throughout the same:

Figure 1:
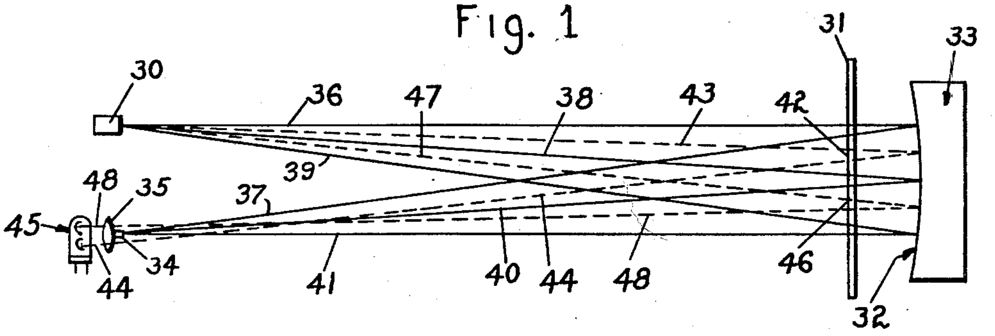
FIG. 1 is a diagram of the optical system employed in one form of the improved inspection apparatus.

With reference now to the drawings, the optical system of one form of the invention, which for purposes of illustration can be considered representative of the basic operating fundamentals of all embodiments of the invention is shown schematically in FIG. 1. As there shown, a light source 30, which in the preferred embodiment is a 50-candle power automobile lamp, illuminates a sheet of glass 31 to be inspected. The light rays after passing through the sheet of glass are reflected from a concave surface 32 of a mirror 33 so that the rays again pass through the glass sheet 31. The reflected rays because of the curvature of the mirror are brought to a focus on a small opaque screen 34 that serves to intercept all of the undeviated rays and which is centrally located on a lens 35. Thus, a light ray 36 proceeding toward the top edge of the glass sheet 31 as shown in FIG. 1 is reflected as a light ray 37 that falls on the opaque screen 34. Similarly two other rays 38 and 39 from the light source directed toward the central and the lower portions, respectively, of the glass sheet 31 are reflected as rays 40 and 41 which also fall on the opaque screen 34. This positioning of the light rays exactly upon the opaque screen is entirely dependent on the fact that the glass sheet has substantially parallel surfaces. However, if any wedge, or lack of parallelism, exists in the glass sheet the rays will be reflected along lines which do not intercept the opaque screen.

For purposes of further explanation the glass 31 may be assumed to have an area 42 exhibiting wedge so that a light ray 43 in passing through the wedged area is refracted downwardly slightly. This ray 43 after reflection from the mirror surface 32 returns through the wedged area 42 and is again refracted downwardly and as ray 44 passes below the opaque screen 34 and through the lens 35. The deviated refracted beam 44 after passing through the lens is focused thereby to direct it onto a light detecting device such as, for example, photoelectric cell 45.

If, on the other hand, an area 46 of the glass sheet 31 exhibits wedge opposite that of area 42, or in other words so as to refract light upwardly, a light beam 47 on passing through the area 46 is refracted upwardly in FIG. 1. When the beam 47 is reflected off the surface 32 it once again passes through the wedged area 46 and is refracted a second time upwardly so that the deviated beam 48 misses the opaque screen and on passing through the lens 35 activates the light detecting device 45. The details of the manner of utilizing the deviated light beams to produce a visible indication of the presence and direction of wedge will be set forth in detail below.

There is the possibility that a piece of glass will have so much wedge that a light beam deviated thereby will miss the lens entirely. However, although this condition may exist in extremely small areas of glass, it has not been found to be a substantial source of difficulty because in the conventional methods of manufacturing sheet and plate glass, which need not concern us at this time, discontinuities in the surface of the glass are not produced, therefore these small excessively wedged areas are surrounded by glass areas having lesser amounts of wedge and these lesser amounts produced a smaller amount of deviation that actuates the detecting device 45 and thereby indicates that the piece of glass is defective.

Figures 2, 17:
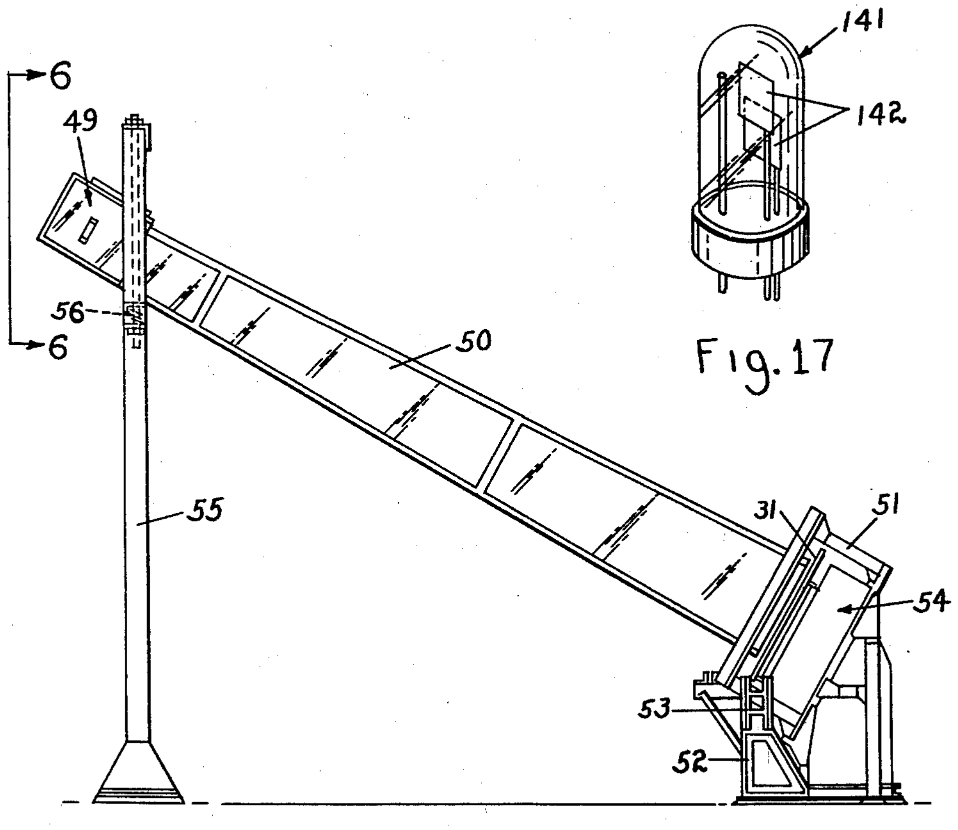
FIG. 2 is a side elevation of the complete inspection apparatus.
FIG. 17 is a perspective view of a special multi-cathode photocell.

The apparatus for inspecting glass sheets and automatically determining the presence and direction of wedge occurring therein as the glass sheets are moved along on a conveyor is illustrated in FIGS. 2 through 12 inclusive. Referring to FIG. 2 the light source 30 and the light detecting device 45 are installed in a light-proof enclosure 49 located at the upper end of an inclined tapered light shield 50, the lower end of which is supported on a framework 51 constructed independently of a second supporting framework 52 carrying a conveyor 53. A mirror housing 54 is supported in the framework 51 and the glass sheets 30 to be inspected are carried by the conveyor 53 through a space between the end of the light shield 50 and the mirror housing 54. The upper end of the light shield 50 is supported by stanchions 55, and compression springs 56 are used to reduce the transmission of vibrations to the light-proof enclosure 49.

Figures 3, 4:
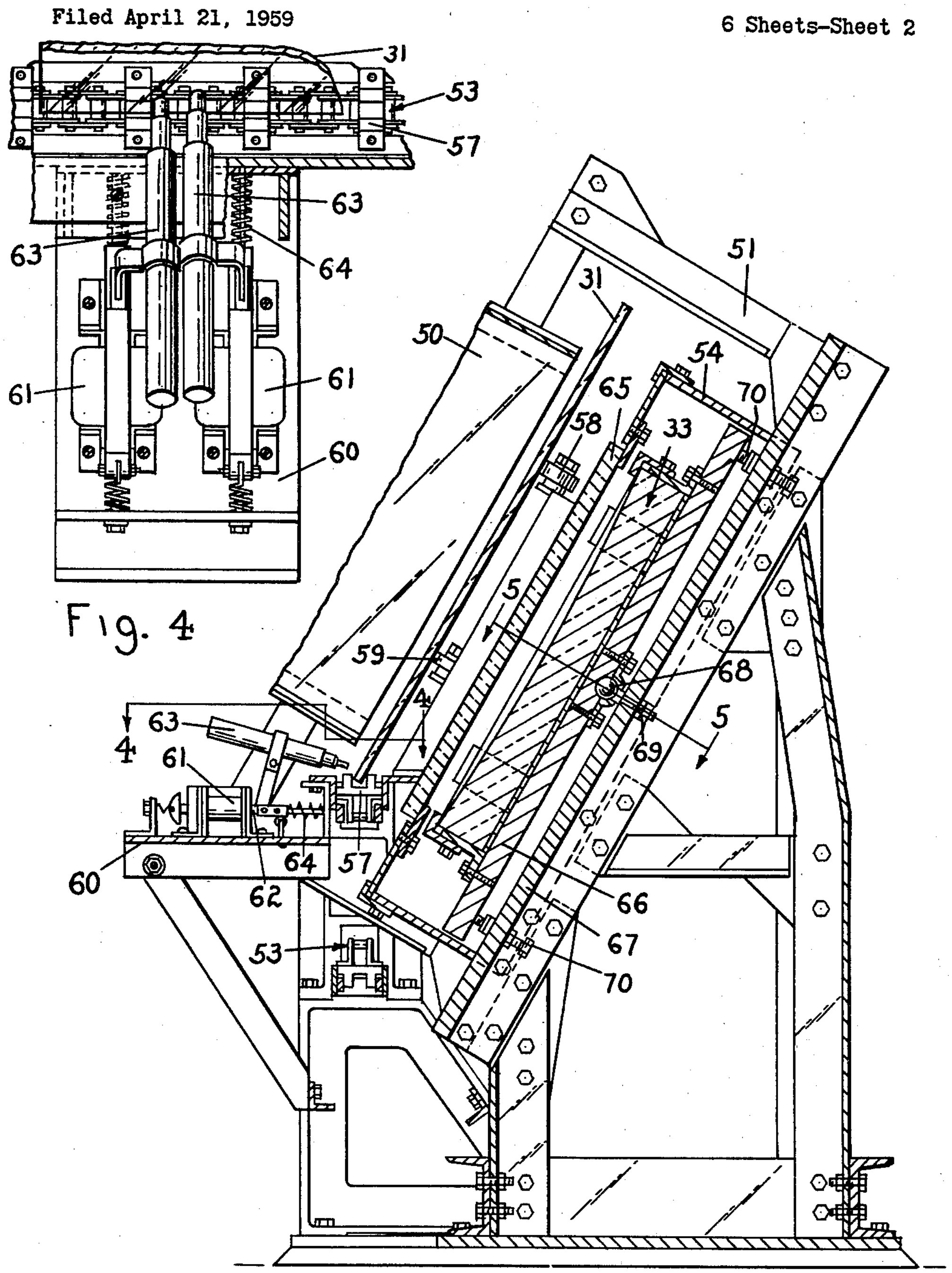
FIG. 3 is a vertical section taken perpendicular to the path of a conveyor and showing the relationship between the glass being inspected and the concave mirror.
FIG. 4 is a fragmentary plan view taken on line 4—4 of FIG. 3 showing a device arranged to mark wedged glass areas.

Referring to FIG. 3 there is shown the conveyor 53 which includes a chain having a plurality of U-shaped rubber blocks 57 for receiving the lower edge portion of glass sheet 31 which is to be inspected. Two series of rollers 58 and 59 having their peripheries covered with rubber or other suitable nonskid and nonmarking material are arranged along the conveyor to guide the glass sheets to be tested and hold them in position for the inspection when they pass through the apparatus. The second supporting framework includes a shelf 60 on which is mounted a pair of solenoids 61, the armatures 62 of which actuate inking guns 63. The inking guns are held in a withdrawn or nonengaging position with respect to the glass by springs 64, but when the solenoids 61 are energized the armatures 62 move the inking guns into contact with the glass. The solenoids are actuated and controlled in a manner which will be set forth in detail below to mark the areas of the glass which have an objectionable amount of wedge and indicate the direction of the wedge by using different colored inks or a different spray pattern for each direction, for example.

The mirror housing 54 has, on the wall facing the glass sheet, a partially masked clear glass window 65 which is free from all traces of wedge or other optical defects. The clear area of the window 65 is disposed so as to register with the area of the glass sheet 31 to be inspected. The housing 54 contains the mirror 33 having a spherically concave reflective surface 32 which is secured and mounted on a base plate 66 which is in turn adjustably mounted on a structural member 67. The mirror base plate 66 is mounted in a ball and socket joint 68 for universal movement which joint is secured to the rigid structural member 67 by bolt 69. A plurality of adjusting screws 70 contact the corners of the base plate 66 and are threaded through the rigid structural member 67 to provide a means for precisely positioning the mirror 33 angularly with respect to the light-proof box 49 and the light source within the housing as shown best in FIG. 3.

Figure 5:
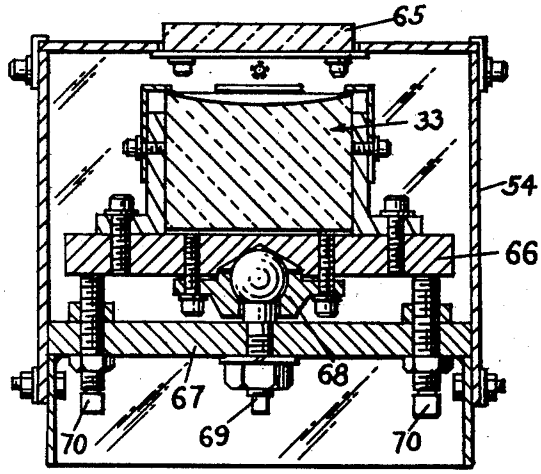
FIG. 5 is a section taken along the line 5—5 of FIG. 3.
Figure 6:
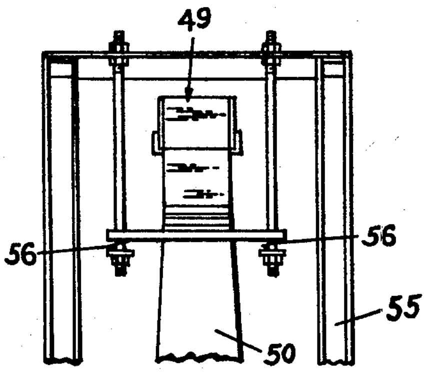
FIG. 6 is a fragmentary end elevation of the upper end of the apparatus taken along line 6—6 of FIG. 2.

From an inspection of FIGS. 3 and 5, it will be noted that the mirror 33 is longer in a direction transverse to the conveyor 53 than it is in a direction along the line of movement of the conveyor. This shape was selected since it is necessary that the mirror be of sufficient length to span the height of the glass sheets carried by the conveyor past the mirror, but the width of the mirror, i.e., its dimension along the path of travel of the conveyor only has to be enough so that the light sensitive means 45 and the solenoids 61 have enough time to act while a glass area exhibiting wedge is being inspected. For example, if a glass sheet being tested is moved relatively slowly the mirror may have a correspondingly narrow width, whereas if the glass is moved relatively rapidly the width of the mirror must be proportionally larger.

The spherically curved face 32 of the mirror 33 has a focal point which is located approximately in the center or slightly forward of the center of the enclosure 49 at the upper end of the light shield which housing encloses the light sources and light detecting apparatus. An even more satisfactory focusing of the light source can be obtained if the mirror is shaped as an ellipsoid, however, in view of the relative difficulty of making an ellipsoid surface as compared to a spherically curved surface it is far less expensive to provide a spherically curved mirror. Also, a spherically curved surface provides a fully adequate focusing for use in the present invention.

Figure 7:
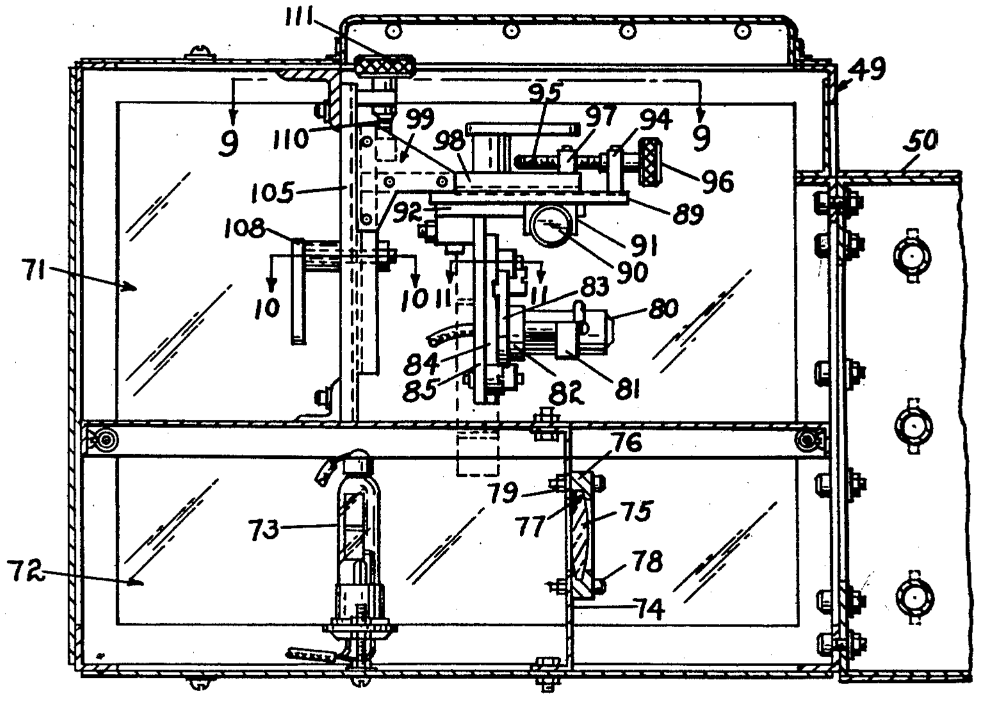
FIG. 7 is an enlarged side elevation of the light sources and light detecting apparatus located at the upper left end of the inspection machine as shown in FIG. 2.

The equipment contained within the light-proof enclosure 49 is illustrated in FIGS. 7 to 12, inclusive. Referring to FIG. 7, the housing 49 is shown divided into an upper chamber 71 containing the light sources and a lower chamber 72 enclosing the light detecting equipment.

The light detecting equipment comprises one or more photoelectric cells 73 mounted behind a partition 74 so that they are darkened except for light that enters through an opening in the partition from the mirror 33 through the light shield tube 50 and lenses 75. The lenses 75 correspond in function to the lens 35 of FIG. 1 and the photoelectric cells 73 correspond to the light detecting device 45.

The lens 75 is fixedly mounted over the opening in the partition 74 by means of a mounting disk 76 having a circular opening therein and provided with rabbeted portions 77 so dimensioned as to receive the lens therein. Mounting screws 78 and nuts 79 hold the disk 76 and the lens 75 in fixed position onto the partition 74.

Figure 8:
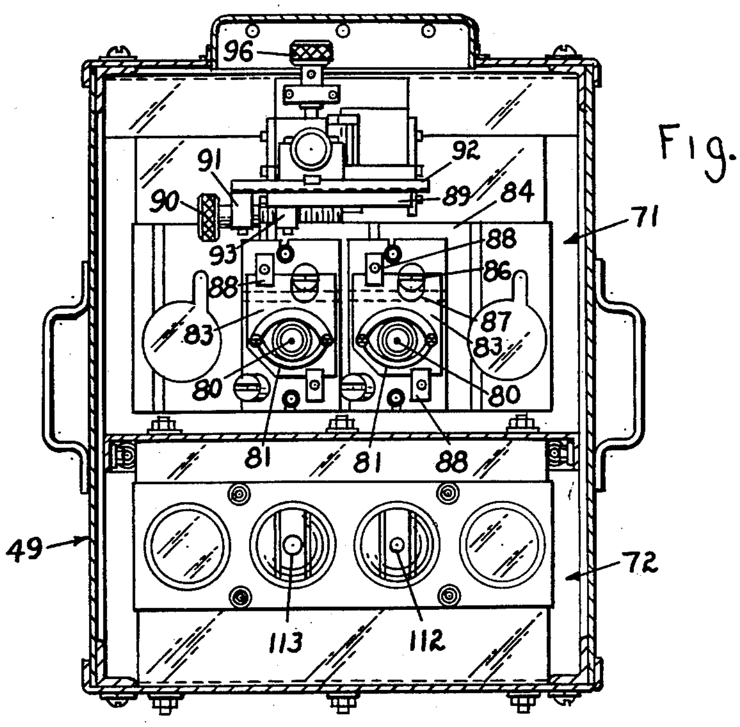
FIG. 8 is an elevation looking along the optical axis of the system toward the light sources and the light detecting apparatus.

The upper chamber 71 of the enclosure 49 contains one or more lamps 80 each supported in a saddle 81 and a socket 82 attached to a mounting plate 83. The mounting plates 83 are provided one for each light source 80 and are keyed to and horizontally adjustable on intermediate mounting plates 84. These intermediate plates are in turn keyed to and vertically adjustable on a gang plate 85. With this construction a tongue in the mounting plate 83 engages a substantially horizontal groove in a corresponding intermediate mounting plate 84 and an eccentric pin 86 engaging a slot 87 (FIG. 8) serves to adjust the mounting plate 83 horizontally as shown in FIG. 8. A pair of clamps 88 are provided for locking the plates 83 to their corresponding intermediate plates 84. A similar mechanical arrangement employing a vertical tongue and groove connection, and a second set of clamps is provided to support the intermediate mounting plates 84 from the gang plate 85.

The gang plate 85 carried by a compound carriage is arranged so that it can be adjusted along any one of three different axes. Thus, the gang plate 85 depends from and is rigidly attached to a slide bar 89 that is mounted for horizontal movement tranversely of the optical axis of the system. Adjustment in this horizontal direction is controlled by a thumb adjustment knob 90, the screw of which is journaled in a depending lug 91 of a horizontal intermediate plate 92 and threadably engages a nut 93 attached to the slide 89.

Figure 9:
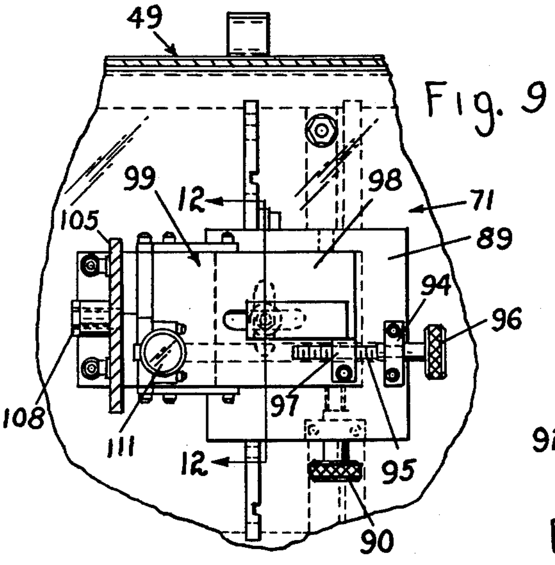
FIG. 9 is a fragmentary sectional view taken along line 9—9 of FIG. 7.

The intermediate plate 92 also carries an upwardly extending lug 94 for journaling an adjusting screw 95 controlled by a thumb wheel 96 (FIG. 9). The adjusting screw 95 threadably engages a nut 97 mounted on a support shelf 98 on a vertically adjustable carriage 99. The two adjustments controlled by the thumb wheels 90 and 96 serve to position the light sources in a horizontal plane, the wheel 90 serving to move the light sources horizontally and perpendicularly to the optical axis while the thumb wheel 96 moves the light along the optical axis.

Figure 12:
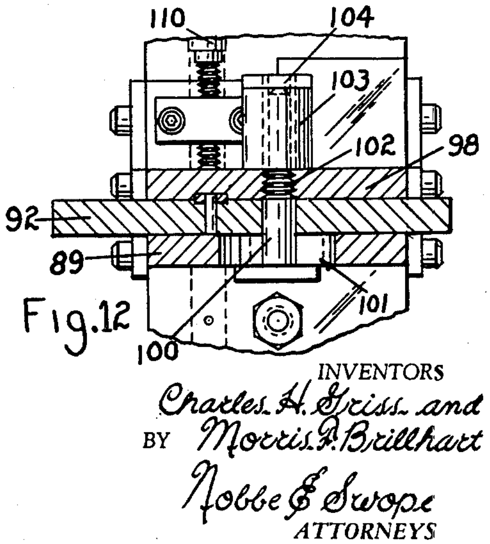
FIG. 12 is a fragmentary sectional view taken along the line 12—12 of FIG. 9.
Figure 11:
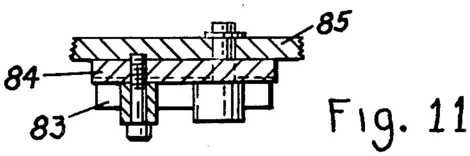
FIG. 11 is a fragmentary sectional view taken along line 11—11 of FIG. 7.

Referring now particularly to FIG. 12, there is illustrated a clamp comprising a bolt 100 extending upwardly through a slot 101 in the slide 89 through a hole in the intermediate plate 92 and through a second slot 102 in the shelf 98 which is engaged by a clamping nut 103 provided with a handle 104 for turning the same. This clamp serves to secure the plates against movement in any horizontal direction.

Figure 10:
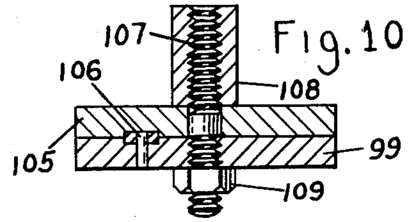
FIG. 10 is a fragmentary sectional view of a clamping means taken along line 10—10 of FIG. 7.

The carriage 99 is disposed on a vertical plate 105 and guided thereon by a tongue and groove joint 106 (FIGS. 8, 9 and 10). A clamp comprising a bolt 107 threaded into a handle 108 and a nut 109 serves to hold the carriage 99 in a fixed position wherever it is placed through the action of an adjusting screw 110 and a thumb wheel 111.

It is the purpose of these adjustments to permit a relative adjustment of the light sources with respect to each other and also to permit adjusting the same as a group. Both types of adjustments are essential for the satisfactory operation of the apparatus, since it is necessary when a glass sheet is not in position for inspection that the light emanating from the light sources 30 shall be accurately focused on the opaque screen 34. A rough positioning of the light spot on the opaque screen is obtained by suitable adjustment of screws 70 which tilt or change the reflective surface 32 of the mirror 33 with respect to the light incident thereon. However, to obtain a fine adjustment it is necessary to move the lamps 80 horizontally or vertically by means of the thumb wheels 90 and 111 until the spot, or spots, produced by the reflected light are located precisely at the center of the opaque screen 34. If the spot or spots are not sharply in focus on the screen, the light sources are moved toward or away from the mirror by properly adjusting the thumb wheel 96. If when one light spot is focused on the screen and properly located at the central portion of the screen, it is found that other spots are not centered properly, the light sources producing such other spots can be moved relatively to the gang plate 85 by means of the individual adjusting screws until such spots are properly centered. Ordinarily, this latter adjustment is not needed except perhaps where a replacement of a light source or sources has been made. When all of the light sources are in precise adjustment, they are arranged substantially equally spaced and linearly with respect to each other, and the lenses 75 are also correspondingly spaced and arranged in a line in the mounting plate 83. The opaque screens are also centered with respect to their respective lenses. When in correct adjustment light that is emitted by the left hand light source (FIG. 8) is received on a small opaque screen 112 located to the right of the vertical center line of the housing while light from the right hand light source is received on the opaque screen 113 to the left of the center line of the housing. Two or more light sources provided with corresponding light sensing devices and lenses are employed whenever it is desired to classify the glass sheets according to the degree of wedge existing in the glass, and to establish, as was pointed out above, something more than grading as merely acceptable or nonacceptable. Thus, one light source and light sensing system is capable of dividing the glass into categories indicating the presence or absence of a prescribed amount of wedge while each additional light source and lens can subdivide the nonacceptable glass according to two more groups.

Although the optical system disclosed hereinabove is fully satisfactory, an alternative optical system which also provides satisfactory results and, which may be used with the aforedescribed apparatus is that illustrated in FIG. 13. As shown there, the light passing through a glass sheet having parallel face surfaces, i.e., exhibiting no wedge, is focused so as to impinge substantially equally onto each of two reflective faces of a prism 114 and thus reflected equally onto two photocells. However, when wedge occurs in the glass sheet, the light beam passing therethrough is deviated as described above and on reaching the prism 114 will be reflected onto one of the photocells in a greater amount than on the other depending on the particular direction of wedge in the portion of the glass being examined. In this manner by the use of a proper electrical circuit and indicating means which will be set forth below, not only can the presence of wedge be noted in a glass sheet, but also its direction can be determined, i.e., which part of the glass sheet is the thinner and which part is the thicker.

Figures 13, 14, 15, 16:
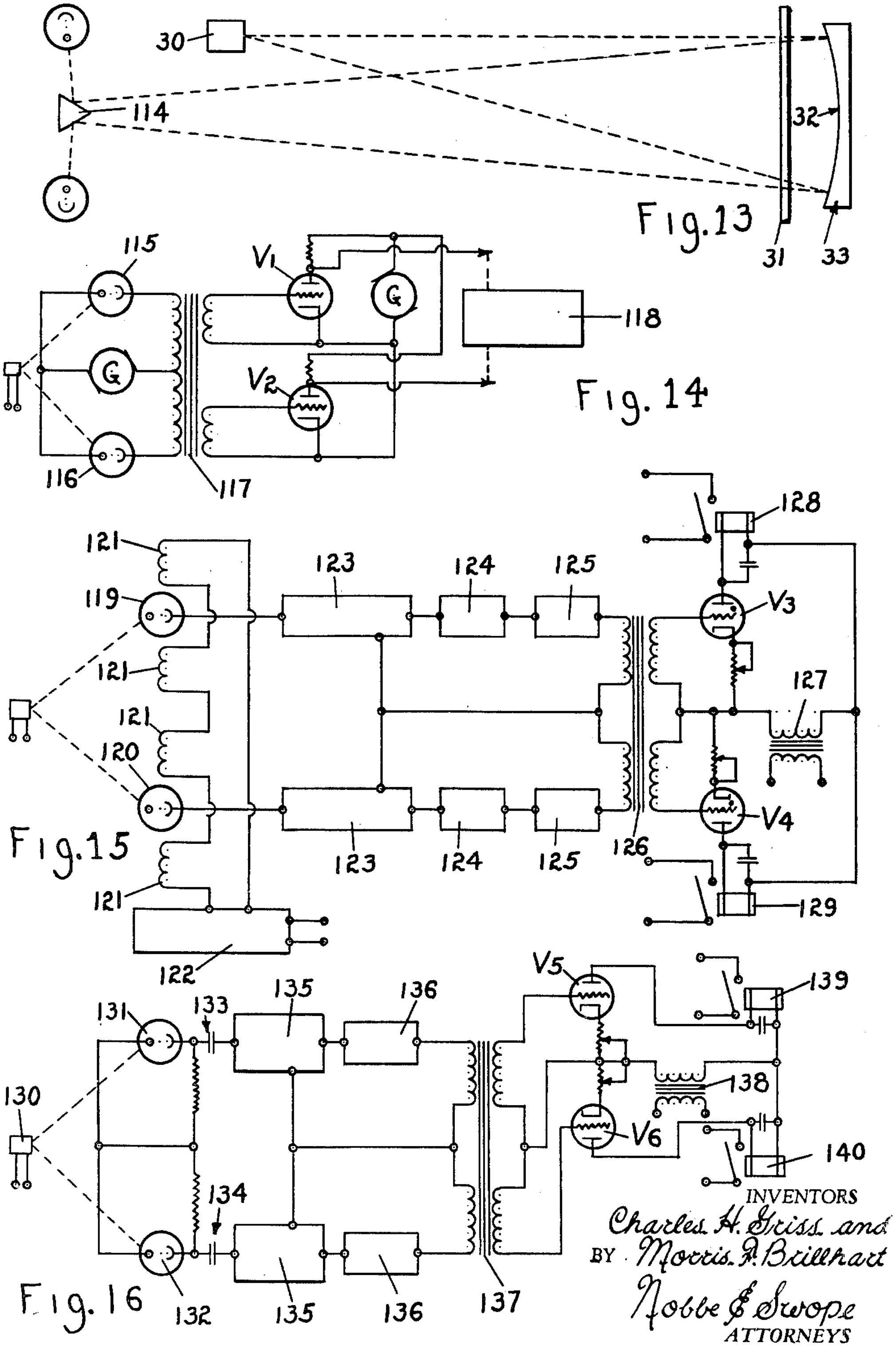
FIG. 13 is a diagram of an optical apparatus employed in another embodiment of the improved inspection apparatus.
FIG. 14 is a schematic wiring diagram for use in one embodiment of the invention.
FIG. 15 is a schematic wiring diagram for use with another embodiment of the invention.
FIG. 16 is a schematic wiring diagram for use with still another embodiment of the invention.

In the discussion of the novel circuits associated with the invention which will be given at this time, it is to be understood that either of the above-described optical systems shown in FIGS. 1 and 13 is considered to be equally applicable. Thus, in the several forms of the circuit illustrated in FIGS. 14 to 16 where the light sources are shown sending light rays along dotted lines to photocells, it is considered within the contemplation of the invention that these rays be supplied to the photocell either by the utilization of the opaque screen optical system of FIG. 1, or the reflective prism optical system of FIG. 13.

Turning now to an examination of the novel electrical apparatus for translating the light intensity differentials into indications of the wedge in a glass sample, there is illustrated in FIG. 14 one form of such an apparatus. Examining it in detail, there is shown a pair of photocells 115 and 116 the cathodes of which are connected across the primary of a transformer 117 with an alternating current supply G connected between a center-tap of the primary winding and the anodes of the two photocells. The transformer 117, is provided with two secondary windings, each of which is electrically connected to the control grid of an amplifier tube (V1, V2), the outputs of which are connected to a suitable indicating device 118, such as a null-center galvanometer. Also, it is to be noted that an A.C. power supply indicated as G is provided to supply the tubes V1 and V2 with electrical operating power which is in phase correspondence with the A.C. power source G on the primary side of transformer 117. If the amount of light impinging on each of the cells 115 and 116 is equal, the voltages produced in the two secondaries of the transformer are equal and thus outputs of the tubes V1 and V2 will be equal causing the indicating instrument 118 to indicate zero deviation or, in effect, zero wedge.

If the photocell 115 is illuminated with more light than photocell 116, a current will flow in the upper half of the primary winding of greater value than the current flowing in the lower half of the primary and, therefore, the voltages induced in the secondaries of the transformer will be larger in the upper secondary than in the lower one, and on amplification will be indicated by the indicator 118 as wedge of a direction corresponding to the given light situation. In the case where the photocell 116 is illuminated more than the photocell 115 the reverse of this situation will occur, that is, V2 will produce a greater output voltage than V1 and the indicating device will indicate the reverse direction of wedge.

In addition to actuating the indicating device 118 the solenoids 61 are wired to the outputs of V1 and V2 in a way well-known in the art for actuating the inking guns 63 to mark the wedged area of the glass.

Another satisfactory electrical apparatus for use in the invention is illustrated in FIG. 15. This apparatus provides an electrical equivalent of the mechanical light chopper or shutter system discussed above and considered to possess certain advantages. In operation a pair of photoelectric cells 119 and 120 are provided with coils 121 disposed in a surrounding relation therewith which on energization by an alternating current source 122 causes a magnetic field to be impressed on the cells of a cyclically varying intensity. This alternating magnetic field will cause the electron streams moving from the cathode to the anode of each of the photocells to be deflected and at the peak of the deflection to actually miss the anode resulting in the output of the photocells being periodically interrupted. As in the case of the prior art mechanical light chopper the periodic interruption of the operation of the photocells provides a stabilizing influence on the complete wedge sensing apparatus and thus reduces the undesirable effect of scattered light produced by haze or films on the glass which otherwise might mistakenly be interpreted by the apparatus as wedge in the glass sheet being tested.

The pulsating electrical impulses of the photocells 119 and 120 are amplified by an amplifier 123 and the amplified signal is then passed through a 120-cycle rejection filter 124 and a 60-cycle rejection filter 125, both of conventional design. The amplified and filtered signals from each cell are then fed into one side of a center-tapped primary winding of a transformer 126. The two secondaries of the transformer 126, as in the system of FIG. 14, are each connected to the control grid of a power tube (V3, V4) which as shown in FIG. 15 are of the hot-cathode, gas-discharge type commonly known as thyratrons. A transformer 127 when connected to a suitable source of power provides electrical energy for the operation of the tubes. The outputs of the tubes V3 and V4, if sufficiently large, energize relays 128 and 129, respectively, the points of which can be used to actuate some type of indicating means and the inking solenoids 61 for marking the wedged portions of the glass.

In operation, if the photocell 119 receives more light than cell 120 a greater signal will be amplified by the upper amplifier 123 and a current will be drawn through the upper primary winding of the transformer 126 producing a correspondingly large induced voltage in the upper secondary of the transformer which will drive the grid of V3 positive causing the tube to conduct and the relay 128 to be energized closing its respective points and indicating wedge having a direction corresponding to this light situation. If the photocell 120 receives more light than 119, in a similar manner V4 will conduct and relay 129 will be actuated to indicate wedge in the glass sample of the opposite direction.

Still another form of the invention that provides a light-chopping effect similar to that produced by the apparatus of FIG. 15 is illustrated in FIG. 16. As there shown, a light source 130 produces a modulated or pulsating light beam, which beam, when used in either of the two optical systems discussed hereinabove, produces a pulsating light beam incident on light sensitive means 131 and 132 which in turn produces pulsating electrical signals proportional to the light incident thereon. The outputs of the two photocells are connected through resistance-capacitance networks 133 and 134, amplifier 135, filters 136 for removing 60 cycle and 120 cycle ripple components, and then impressed upon the primary of center-tapped transformer 137.

The secondary of transformer 137 drives tubes V5 and V6, provided with the required amount of A.C. power by transformer 138, the outputs of which serve to energize relays 139 and 140. These relays are connected in the same manner and perform the same functions as those discussed above in regard to the apparatus of FIG. 15.

Although other values may be found to be satisfactory, applicants have found that best results were achieved when the light source 130 was modulated or periodically pulsed at approximately 100 cycles per second. In this regard, it is important to note that the frequency of modulation for satisfactory results must not be 60 cycles or harmonics thereof, otherwise erratic operation can result due to noise and ripple effects.

Referring now to FIG. 17 there is shown a special type of photocell 141 having a pair of cathodes 142 arranged with their flat surfaces parallel to one another in a spaced relation with an edge of one cathode in a slightly overlapping relation to an edge of the second cathode. This special photocell has particular adaptability for use with the optical system illustrated in FIG. 1 and any of the associated electrical apparatuses of FIGS. 14, 15 and 16. In practice, the lens 35 and the opaque screen 34 are so arranged relative to the two-cathode photocell, that wedge of one direction deviates the light beam causing it to fall in a greater amount upon one or the other of the cathodes. However, when wedge of an opposite character occurs in the glass being tested the deviation will cause the light spot to move off the opaque screen in the opposite direction and impinge upon the other cathode of the photocell. In this way it is possible to incorporate the function of two photocells in one glass envelope and thus to materially simplify the light sensing apparatus of the invention.

Figure 18:
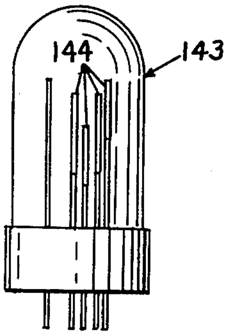
FIG. 18 is an elevation of still another type of multi-cathode photocell for use in another embodiment of the invention.
Figure 19:
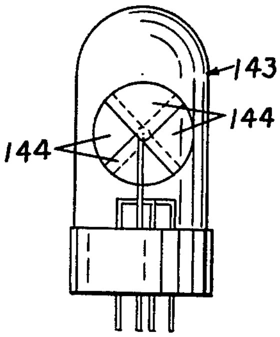
FIG. 19 is an elevation of the photoelectric cell shown in FIG. 18 as viewed normal to the cathode surfaces.
Figure 20:
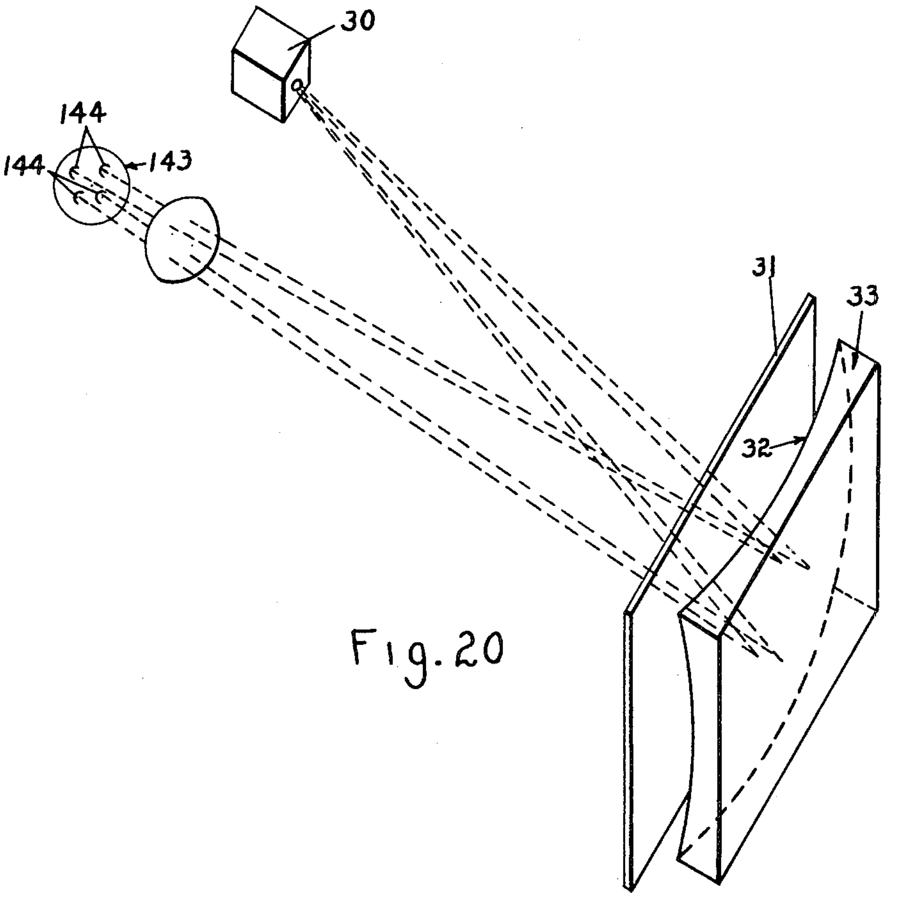
FIG. 20 is a diagram of the optical system employed in an embodiment of the improved inspection apparatus utilizing the photocell of FIGS. 18 and 19.

The twin-cathode concept may be extended to include more electrically independent cathodes, such as the photocell 143 shown in FIGS. 18 to 20 having four cathodes 144 contained within the same glass envelope. Thus, as there illustrated the photocell has four cathodes arranged in a spaced slightly edge overlapping relation with respect to each other with their active surfaces facing in the same direction and presenting approximately equal areas to the impinging light beam coming from the glass being tested. As shown in FIG. 20, the deviated beam will be focused more or less on the different cathodes according to the direction of wedge in the glass sheets which by the use of an electrical apparatus similar to those illustrated hereinabove can be made to indicate four zones of acceptability and nonacceptability.

Although each of the above described electrical apparatuses has been illustrated utilizing photoelectric cells as the fundamental light sensing device, it is considered within the contemplation of the invention to employ other types of light sensitive devices such as photoconductive cells, photovoltaic cells or phototransistors, since the changes in the circuits that would be necessary to do this can be readily accomplished by one skilled in the art.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. A method of inspecting glass sheets for the presence of wedge in areas thereof, comprising the steps of angularly directing a light beam through a glass sheet to be inspected, focusing said light beam onto an opaque screen of a dimension slightly larger than said focused beam so that any wedge present in the glass will deviate the beam outwardly of said screen, impinging said beam falling outwardly of said screen onto individual light sensitive means to produce a plurality of independent electric signals proportional to the amount of light incident on each said light sensitive means, periodically interrupting the electric signal produced by each said light sensitive means, and measuring the relative values of the interrupted electrical signals generated by the individual light sensitive means to determine the amount and direction of wedge in the glass sheet being inspected.

2. A method of inspecting glass sheets for the presence of wedge in areas thereof, comprising the steps of angularly directing a light beam through a glass sheet to be inspected, focusing said light beam onto two surfaces of a reflective prism whereby said beam impinges on said surfaces in equal amounts when the areas of the glass sheet through which said light beam passes have parallel surfaces, impinging the light reflecting from each said prism surface onto an individual light sensitive means to produce independent electric signals proportional to the amount of light incident on each said light sensitive means, periodically interrupting the electric signal produced by each said light senstive means, and measuring the relative values of the interrupted electrical signals generated by the individual light sensitive means to determine the amount and direction of wedge in the glass sheet being inspected.

3. Apparatus for detecting the presence of wedge in a glass sheet, comprising a light source for directing light through said sheet, means intercepting the light beam coming from the glass sheet for separating the deviated portion of the light from the undeviated, light sensitive means disposed to receive the deviated light for producing electrical signals proportional to the said deviated light, a capacitor-charging circuit electrically connected to the light sensitive means for periodically interrupting the production of said electrical signals by said light sensitive means, and means actuated by said signals for indicating the presence and direction of wedge in the glass.

4. Apparatus for detecting the presence of wedge in a glass sheet, comprising a mirror disposed at one side of the glass sheet, a light source disposed opposite said mirror for passing light beams through the glass sheet to be tested and onto said mirror, an opaque screen for receiving the focused reflected light thereon, light responsive means for receiving light deviated by said sheet which passes outwardly of said opaque screen for producing electric signals proportional to the light incident thereon, capacitor-charging circuits for periodically interrupting the production of said electric signals by said light responsive means, and means actuated by said periodically interrupted electric signals for indicating the presence and direction of wedge in the glass.

5. Apparatus for detecting the presence of wedge in a glass sheet comprising a light source on one side of said sheet for passing a light beam through said glass sheet, a concave mirror on the other side of said sheet for reflecting and focusing the beam back through said glass sheet, an angular prism located substantially at the focal point of the concave mirror for receiving substantially undeviated focused light rays from said glass in equal amounts on two reflective surfaces thereof, means responsive to the light reflected from said prism surfaces for producing electrical signals, a capacitor-charging circuit for periodically interrupting the production of said electrical signals from said light responsive means, and means actuated by the differential of said periodically interrupted electrical signals for indicating the presence and direction of wedge in the glass.

References Cited in the file of this patent

UNITED STATES PATENTS

| | | |
|---|---|---|
| 1,936,400 | Langmuir | Nov. 21, 1933 |
| 2,429,066 | Kuehni | Oct. 14, 1947 |
| 2,735,331 | McMaster et al. | Feb. 21, 1956 |
| 2,941,081 | Greenlee et al. | June 14, 1960 |